(12) United States Patent
Tsuda et al.

(10) Patent No.: US 12,291,122 B2
(45) Date of Patent: May 6, 2025

(54) CHARGING ASSISTANCE SYSTEM, METHOD, AND COMPUTER PROGRAM

(71) Applicant: SUMITOMO ELECTRIC INDUSTRIES, LTD., Osaka (JP)

(72) Inventors: Hiroyuki Tsuda, Tokyo (JP); Hiroshi Maeda, Tokyo (JP); Tomoyuki Kitada, Tokyo (JP); Nana Aitani, Osaka (JP); Shinichi Okano, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 719 days.

(21) Appl. No.: 17/283,207

(22) PCT Filed: Nov. 16, 2018

(86) PCT No.: PCT/JP2018/042483
§ 371 (c)(1),
(2) Date: Apr. 6, 2021

(87) PCT Pub. No.: WO2020/100288
PCT Pub. Date: May 22, 2020

(65) Prior Publication Data
US 2021/0380012 A1 Dec. 9, 2021

(51) Int. Cl.
*B60L 53/64* (2019.01)
*B60L 53/66* (2019.01)

(52) U.S. Cl.
CPC ............. *B60L 53/64* (2019.02); *B60L 53/66* (2019.02); *B60L 2240/62* (2013.01)

(58) Field of Classification Search
CPC ...... B60L 53/64; B60L 53/66; B60L 2240/62; B60L 53/67; B60L 2240/32; B60L 2240/68; B60L 2240/70; B60L 2240/80; B60L 2250/14; B60L 2250/16; B60L 2250/20; B60L 2260/54; B60L 2260/58; B60L 58/12; B60L 53/62; G01C 21/3469; G01C 21/3476; G01C 21/3492; Y02T 10/72; Y02T 90/12; Y02T 90/167; Y02T 10/70; Y02T 10/7072; Y02T 90/14; Y02T 90/16; Y04S 30/14
See application file for complete search history.

(56) References Cited

U.S. PATENT DOCUMENTS

| | | | |
|---|---|---|---|
| 10,126,138 B1 * | 11/2018 | Farmer | G06Q 50/40 |
| 2008/0262667 A1 | 10/2008 | Otabe | |
| 2010/0106401 A1 * | 4/2010 | Naito | B60L 53/00 |
| | | | 701/533 |
| 2010/0138098 A1 * | 6/2010 | Takahara | G09B 29/106 |
| | | | 701/31.4 |

(Continued)

FOREIGN PATENT DOCUMENTS

| | | |
|---|---|---|
| DE | 10 2016 124 109 A1 | 6/2017 |
| EP | 2 752 962 A1 | 7/2014 |

(Continued)

*Primary Examiner* — Stacy Whitmore
(74) *Attorney, Agent, or Firm* — Oliff PLC

(57) ABSTRACT

A charging assistance system includes a processor configured to execute a generation process of generating charging plan data for a vehicle on the basis of: predicted power consumption of the vehicle calculated on the basis of a future traveling schedule of the vehicle; and a charging condition at each predicted stop place based on the traveling schedule.

15 Claims, 14 Drawing Sheets

(56) References Cited

U.S. PATENT DOCUMENTS

| | | | |
|---|---|---|---|
| 2011/0047052 A1* | 2/2011 | Cornish | G06Q 40/04 705/37 |
| 2011/0074350 A1* | 3/2011 | Kocher | B60L 53/63 320/109 |
| 2011/0246252 A1* | 10/2011 | Uesugi | G06Q 10/10 705/7.12 |
| 2013/0079962 A1* | 3/2013 | Ishikawa | B60L 15/2045 701/22 |
| 2013/0093393 A1 | 4/2013 | Shimotani et al. | |
| 2013/0204471 A1* | 8/2013 | O'Connell | B60L 53/68 701/22 |
| 2013/0261953 A1 | 10/2013 | Kiyama et al. | |
| 2014/0129132 A1 | 5/2014 | Yoshizu | |
| 2014/0163877 A1 | 6/2014 | Kiyama et al. | |
| 2016/0185246 A1* | 6/2016 | Paul | B60L 53/65 320/106 |
| 2017/0045904 A1* | 2/2017 | Nishita | B60L 53/63 |
| 2017/0066429 A1* | 3/2017 | Ogawa | B60W 10/06 |
| 2017/0088000 A1* | 3/2017 | Payne | B60L 53/64 |
| 2017/0147989 A1* | 5/2017 | Onimaru | G08G 1/0145 |
| 2017/0176195 A1* | 6/2017 | Rajagopalan | B60L 58/12 |
| 2017/0250550 A1* | 8/2017 | Miftakhov | H02J 3/007 |
| 2017/0370732 A1* | 12/2017 | Bender | G08G 1/096838 |
| 2018/0029500 A1* | 2/2018 | Katanoda | G01C 21/26 |
| 2018/0065494 A1* | 3/2018 | Mastrandrea | G06Q 10/02 |
| 2018/0068563 A1* | 3/2018 | Barajas Gonzalez | G08G 1/09626 |
| 2018/0086224 A1* | 3/2018 | King | H01M 10/663 |
| 2018/0120123 A1* | 5/2018 | Seok | G01C 21/3605 |
| 2018/0172458 A1* | 6/2018 | Yamamoto | G01C 21/3438 |
| 2019/0275893 A1* | 9/2019 | Sham | B60L 58/12 |
| 2019/0276002 A1* | 9/2019 | Ito | B60W 50/0097 |
| 2019/0283622 A1* | 9/2019 | Watanabe | G06F 9/542 |
| 2020/0141748 A1* | 5/2020 | Krysiuk | G01C 21/3446 |
| 2020/0249047 A1* | 8/2020 | Balva | G01C 21/3438 |
| 2021/0285787 A1* | 9/2021 | Alekseenko | G01C 21/3682 |
| 2022/0153086 A1* | 5/2022 | Zaeri | B60H 1/322 |

FOREIGN PATENT DOCUMENTS

| | | |
|---|---|---|
| JP | 2006-215041 A | 8/2006 |
| JP | 2008-238972 A | 10/2008 |
| JP | 2009-186219 A | 8/2009 |
| JP | 2013-210281 A | 10/2013 |
| JP | 2015-060570 A | 3/2015 |
| JP | 2016-006400 A | 1/2016 |
| JP | 2018-102047 A | 6/2018 |
| WO | 2012/046269 A1 | 4/2012 |
| WO | 2013/005299 A1 | 1/2013 |
| WO | 2015/041366 A1 | 3/2015 |
| WO | 2015/049969 A1 | 4/2015 |

* cited by examiner

FIG. 6

PREDICTED POWER CONSUMPTION DATA

| DEPARTURE DATE AND TIME (CONSUMPTION STARTING DATE AND TIME) | ORIGIN | ARRIVAL DATE AND TIME (CONSUMPTION FINISHING DATE AND TIME) | DESTINATION | PREDICTED POWER CONSUMPTION |
|---|---|---|---|---|
| 6/12 6:40 | HOME | 6/12 7:30 | WORKPLACE | 600Wh |
| 6/12 12:00 | WORKPLACE | 6/12 12:30 | LOCATION A | 300Wh |
| 6/12 13:00 | LOCATION A | 6/12 13:35 | WORKPLACE | 315Wh |
| 6/12 18:00 | WORKPLACE | 6/12 18:55 | HOME | 620Wh |
| 6/13 8:30 | HOME | 6/13 11:55 | LOCATION B | 1400Wh |
| 6/13 16:10 | LOCATION B | 6/13 19:50 | HOME | 1350Wh |

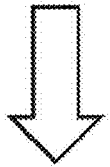

PREDICTED STOP DATA

| STOP STARTING DATE AND TIME | STOP FINISHING DATE AND TIME | PREDICTED STOP PLACE |
|---|---|---|
| 6/12 0:00 | 6/12 6:40 | HOME |
| 6/12 7:30 | 6/12 12:00 | WORKPLACE |
| 6/12 12:30 | 6/12 13:00 | LOCATION A |
| 6/12 13:35 | 6/12 18:00 | WORKPLACE |
| 6/12 18:55 | 6/13 8:30 | HOME |
| 6/13 11:55 | 6/13 16:10 | LOCATION B |
| 6/13 19:50 | 6/13 24:00 | HOME |

CHARGING ASSISTANCE SYSTEM, METHOD, AND COMPUTER PROGRAM

TECHNICAL FIELD

The present disclosure relates to a charging assistance system, a method, and a computer program.

BACKGROUND ART

Patent Literature 1 discloses a charging control device for making a charging plan. The charging control device in Patent Literature 1 calculates a necessary charging amount for traveling through a traveling scheduled route of a vehicle and makes a charging plan for charging to the necessary charging amount at the lowest electricity price.

CITATION LIST

Patent Literature

Patent Literature 1: WO2012/046269

SUMMARY OF INVENTION

A charging assistance system of the present disclosure includes a processor configured to execute a generation process of generating charging plan data for a vehicle on the basis of: predicted power consumption of the vehicle calculated on the basis of a future traveling schedule of the vehicle; and a charging condition at each predicted stop place based on the traveling schedule.

A charging assistance system according to another aspect of the present disclosure includes: a storage device configured to store, for a plurality of charging possible places, charging condition data in which the places and charging conditions at the places are associated with each other; and a processor configured to execute a process of acquiring the charging condition at a predicted stop place of a vehicle by referring to the charging condition data, and generating charging plan data for the vehicle on the basis of the acquired charging condition.

Still another aspect of the present disclosure is a method. The method of the present disclosure includes generating charging plan data for a vehicle on the basis of: predicted power consumption of the vehicle calculated on the basis of a future traveling schedule of the vehicle; and a charging condition at each predicted stop place based on the traveling schedule.

A method according to still another aspect includes acquiring, by referring to charging condition data in which a plurality of charging possible places and charging conditions at the places are associated with each other, the charging condition at a predicted stop place of a vehicle, and generating charging plan data for the vehicle on the basis of the acquired charging condition.

Still another aspect of the present disclosure is a computer program. The computer program of the present disclosure causes a computer to execute a process of generating charging plan data for a vehicle on the basis of: predicted power consumption of the vehicle calculated on the basis of a future traveling schedule of the vehicle; and a charging condition at each predicted stop place based on the traveling schedule.

A computer program according to still another aspect causes a computer to execute a process of acquiring, by referring to charging condition data in which a plurality of charging possible places and charging conditions at the places are associated with each other, the charging condition at a predicted stop place of a vehicle, and generating charging plan data for the vehicle on the basis of the acquired charging condition.

BRIEF DESCRIPTION OF DRAWINGS

FIG. 6 illustrates a process for generating predicted stop data from predicted power consumption data.

DESCRIPTION OF EMBODIMENTS

Figure 1:
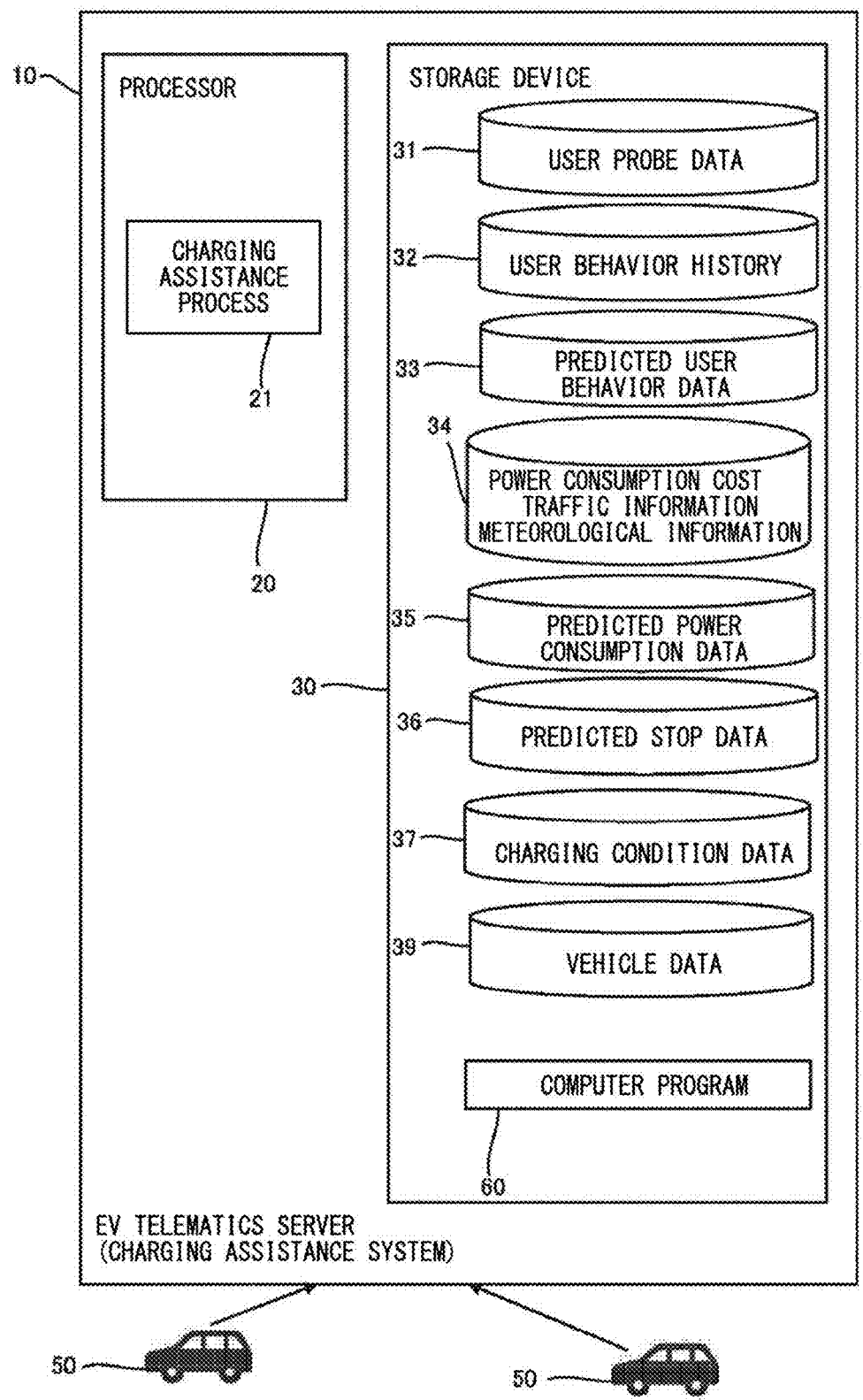
FIG. 1 is a configuration diagram of a charging assistance system.

Problems to be Solved by the Present Disclosure

Charging conditions such as an electricity price may be different depending on a charging place. For example, a contracted electricity price plan may be different between the user's home and workplace. In addition, while charging at home requires cost, charging at the workplace may be free of charge because the workplace bears cost. Also, among different operating companies for charging stations or different power companies for supplying power to charging stations, electricity prices may be different. Further, in an area where demand response (DR) is applied, conditions such as electricity price change, point provision, and power consumption restriction may be set for adjustment of the power consumption amount. In addition, as charging conditions, not only electricity prices but also a charging voltage, a charging standard, and the like are included. As described above, the charging conditions may be different depending on the place.

If a charging plan is made without taking difference in the charging condition among places into consideration, an appropriate charging plan is not obtained. Therefore, in order to make an appropriate charging plan, it is desired to take the charging conditions different among places into consideration.

Description of Embodiments of the Present Disclosure (1) A charging assistance system according to an embodiment includes a processor configured to execute a generation process of generating charging plan data for a vehicle on the basis of: predicted power consumption of the vehicle calculated on the basis of a future traveling schedule of the vehicle; and a charging condition at each predicted stop place based on the traveling schedule. The future traveling schedule may be mechanically created by the charging assistance system or the like, or may be created through user's inputs. The charging assistance system according to the embodiment takes the charging condition at each predicted stop place into consideration, and thus can make an appropriate charging plan.

(2) Preferably, the traveling schedule includes an origin and a destination, and the predicted stop place is determined by the processor on the basis of at least one of the origin and the destination. In this case, it is possible to easily determine the predicted stop place.

(3) Preferably, the charging plan data is generated further on the basis of a predicted stop period at each predicted stop place. In this case, it is possible to generate a more appropriate charging plan in accordance with the length of the predicted stop period.

(4) Preferably, the traveling schedule includes a departure time and an arrival time of the vehicle, and the predicted stop period is determined by the processor on the basis of the departure time and the arrival time. In this case, it is possible to easily determine the predicted stop period.

(5) Preferably, the charging condition includes an electricity price at the predicted stop place. In this case, it is possible to generate an appropriate charging plan while taking difference in the electricity price among places into consideration.

(6) Preferably, the charging condition includes a charging voltage at the predicted stop place. In this case, it is possible to generate an appropriate charging plan while taking difference in the charging voltage among places into consideration. It is noted that the charging voltage is, for example, 100 V or 200 V.

(7) Preferably, the charging condition includes a charging standard available at the predicted stop place. In this case, it is possible to generate an appropriate charging plan while taking difference in the charging standard among places into consideration. In addition, the charging standard can be used also as information for discriminating whether or not quick charging is adopted. In creating the charging plan, whether or not the charging type available at the predicted stop place is a quick charging type may be taken into consideration.

(8) Preferably, the charging condition includes a condition set for the predicted stop place in accordance with demand response. In this case, it is possible to create an appropriate charging plan while taking a condition set for the predicted stop place in accordance with demand response, into consideration.

(9) Preferably, the processor further executes a display process of displaying the traveling schedule and a charging plan indicated by the charging plan data, on a display device. In this case, the user can easily recognize the traveling schedule and the charging plan.

(10) A charging assistance system according to an embodiment includes: a storage device configured to store, for a plurality of charging possible places, charging condition data in which the places and charging conditions at the places are associated with each other; and a processor configured to execute a process of acquiring the charging condition at a predicted stop place of a vehicle by referring to the charging condition data, and generating charging plan data for the vehicle on the basis of the acquired charging condition. The charging assistance system according to the embodiment takes the charging condition at each predicted stop place into consideration, and thus can make an appropriate charging plan.

(11) Preferably, the predicted stop place is determined by the processor on the basis of a future traveling schedule of the vehicle. In this case, it is possible to easily determine the predicted stop place.

(12) A method according to an embodiment includes generating charging plan data for a vehicle on the basis of: predicted power consumption of the vehicle calculated on the basis of a future traveling schedule of the vehicle; and a charging condition at each predicted stop place based on the traveling schedule.

(13) A method according to an embodiment includes acquiring, by referring to charging condition data in which a plurality of charging possible places and charging conditions at the places are associated with each other, the charging condition at a predicted stop place of a vehicle, and generating charging plan data for the vehicle on the basis of the acquired charging condition.

(14) A computer program according to an embodiment causes a computer to execute a process of generating charging plan data for a vehicle on the basis of: predicted power consumption of the vehicle calculated on the basis of a future traveling schedule of the vehicle; and a charging condition at each predicted stop place based on the traveling schedule.

(15) A computer program according to an embodiment causes a computer to execute a process of acquiring, by referring to charging condition data in which a plurality of charging possible places and charging conditions at the places are associated with each other, the charging condition at a predicted stop place of a vehicle, and generating charging plan data for the vehicle on the basis of the acquired charging condition.

The above computer program is stored in a computer-readable non-transitory storage medium.

Details of Embodiments of the Present Disclosure

FIG. 1 shows a charging assistance system 10 according to an embodiment. The charging assistance system 10 has a function of creating a charging plan for an electric vehicle (EV) 50. Hereinafter, the electric vehicle is simply referred to as vehicle. The charging assistance system 10 is constructed as one function of an EV telematics server, for example. The EV telematics server is set on a network such as the Internet. The charging assistance system 10 of the embodiment receives probe data wirelessly transmitted from each traveling vehicle 50, via the network.

The charging assistance system 10 is configured by a computer including a processor 20 and a storage device 30. The computer may be a computer on the network such as the aforementioned EV telematics server, may be a computer mounted on the vehicle 50, or may be a computer composing a mobile terminal that a user has.

The storage device 30 stores a computer program 60 for causing the computer to function as the charging assistance system 10. The processor 20 reads and executes the computer program 60 stored in the storage device 30. The computer program 60 causes the processor 20 to execute a charging assistance process 21.

The storage device 30 stores various data to be used in the charging assistance process 21. For example, the storage device 30 includes a user probe data table 31. In the user probe data table 31, probe data transmitted from the vehicle 50 of each user is registered on a user (vehicle) basis. The probe data is data used for analyzing a traveling behavior of the vehicle. The probe data includes, for example, time (transmission time), geographical coordinates (latitude, longitude), and a vehicle speed. The probe data is transmitted at regular intervals, or when event-driven, from the vehicle 50. The probe data may include the state of charge (SOC) of a battery mounted on the vehicle 50. By the charging assistance system 10 referring to the state of charge (SOC) included in the probe data, the system 10 can easily recognize the state of charge of the vehicle 50. For example, the SOC included in the probe data may be used as a start SOC described later, which is used for creating a charging plan. In addition, the probe data may include the deterioration degree of the battery mounted on the vehicle 50. A battery capacity indicated by vehicle data 39 described later is corrected in accordance with the battery deterioration degree, whereby the present battery capacity can be calculated. As a result, the charging assistance system 10 can generate a charging plan in which the state of the vehicle at present is accurately reflected.

The storage device 30 includes a user behavior history table (traveling history table) 32. In the user behavior history table 32, a past traveling history analyzed from the probe data is stored as a user behavior history. The traveling history (behavior history) includes, for example, time (date and time) and an origin and a destination (OD) of the vehicle.

The storage device 30 includes a predicted user behavior data table (predicted traveling schedule data table) 33. In the predicted user behavior data table 33, a user's future behavior (predicted traveling schedule) predicted from the past traveling history is stored. The predicted traveling schedule includes, for example, time (date and time) and the OD of the vehicle.

The storage device 30 includes a data table 34 of a power consumption cost and the like. The data table 34 includes data indicating the power consumption cost. The power consumption cost indicates power consumption in traveling on a road. The power consumption cost is set for each individual road link composing a road network, for example. The power consumption cost is set, for each road link, as average power consumption needed for passing through the road link, for example. The data table 34 includes data indicating traffic information. The traffic information includes, for example, congestion information. The traffic information such as congestion information influences power consumption during traveling of the vehicle 50, and therefore is used for predicting power consumption of the vehicle 50. Here, the traffic information is future traffic information predicted from the past traffic information. The data table 34 includes data indicating meteorological information. The meteorological information includes, for example, temperature information or weather information. The meteorological information such as temperature information influences power consumption during traveling of the vehicle 50, and therefore is used for predicting power consumption of the vehicle 50. Here, the meteorological information is future meteorological information (weather forecast information).

The storage device 30 includes a predicted power consumption data table 35. In the predicted power consumption data table 35, predicted power consumption and the like calculated on the basis of the predicted traveling schedule of the vehicle 50 are stored.

The storage device 30 includes a predicted stop data table 36. In the predicted stop data table 36, a predicted stop place and the like in accordance with the predicted traveling schedule of the vehicle 50 are stored.

The storage device 30 includes a charging condition data table 37. In the charging condition data table 37, charging conditions on a place basis are stored for a plurality of charging possible places.

The storage device 30 includes a vehicle data table 39. In the vehicle data table 39, data (vehicle data) regarding the user's vehicle supported by charging assistance is stored. The vehicle data includes, for example, a vehicle type, rating types for charging (types of standards such as charging voltage and connector shape), and a battery capacity.

Figure 2:
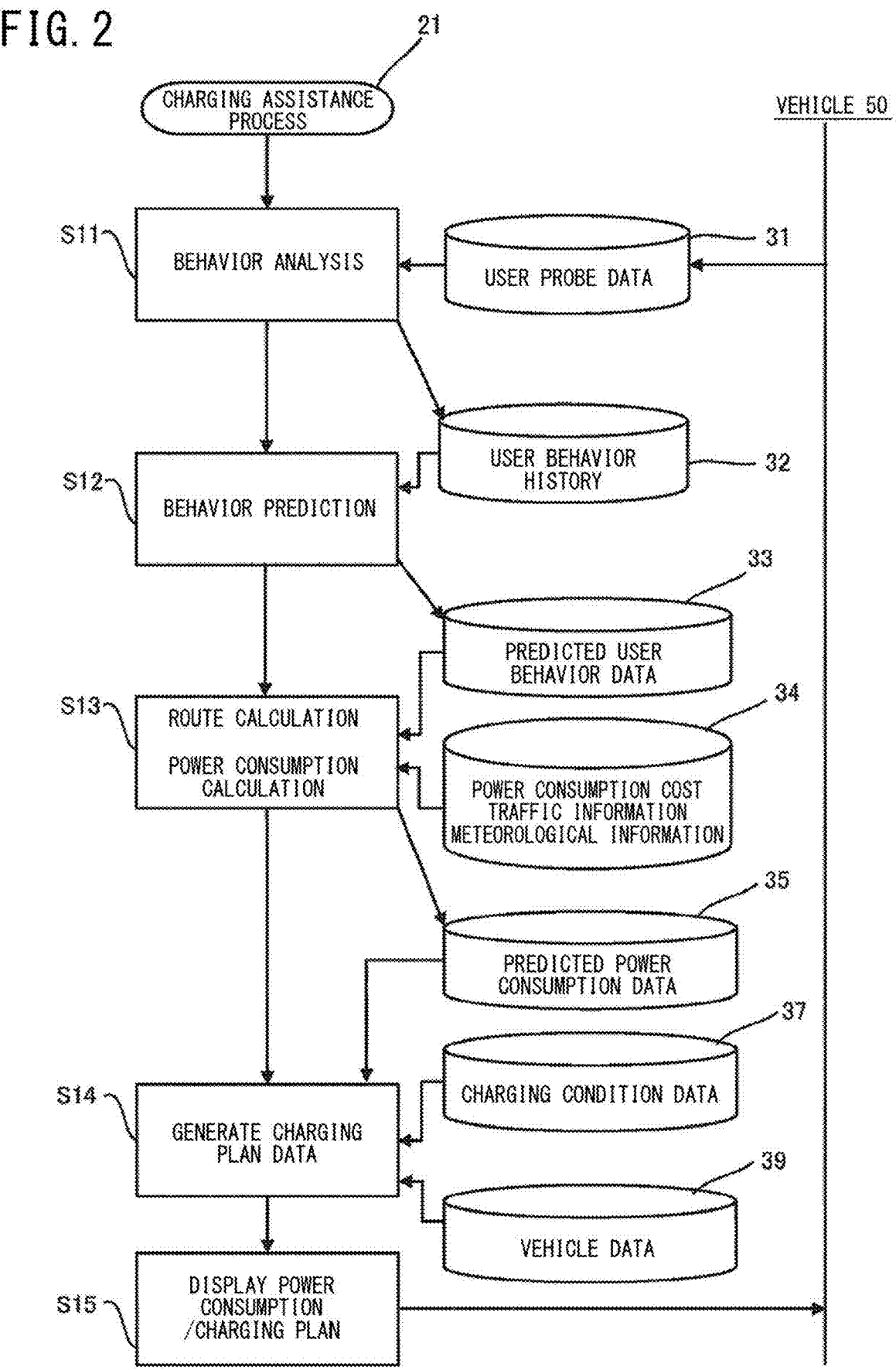
FIG. 2 is a flowchart of a charging assistance process.

FIG. 2 shows a procedure of the charging assistance process 21 to be executed by the processor 20. The outline of the charging assistance process 21 according to the embodiment is as follows. First, in step S11, behavior analysis is performed to analyze the past behaviors (traveling history) of the user. In step S12, behavior prediction is performed to predict future behaviors (traveling schedule) of the user (vehicle) from the past behaviors (traveling history). In step S13, predicted power consumption of the vehicle 50 is calculated from the future behavior prediction (traveling schedule). In step S14, charging plan data for the vehicle 50 is generated from the predicted power consumption. In step S15, the power consumption and the charging plan are displayed on a display device.

Figure 3:
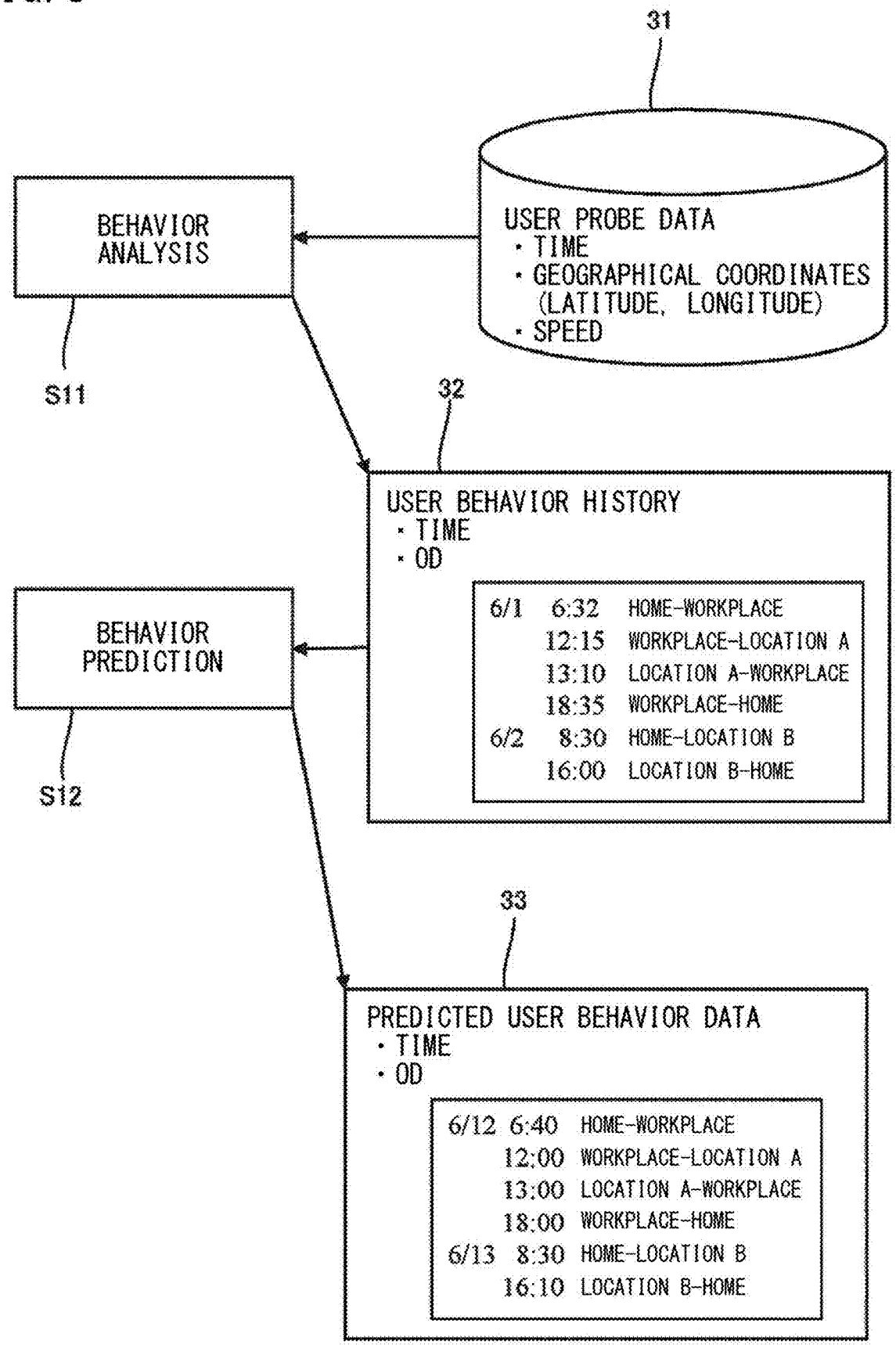
FIG. 3 illustrates a behavior analysis process and a behavior prediction process.

As shown in FIG. 3, in the behavior analysis in step S11, the charging assistance system 10 refers to the user probe data table 31 and performs behavior analysis on the basis of the probe data for each user (vehicle). In the behavior analysis, the time, the geographical coordinates, and the speed included in the probe data are analyzed. Through the behavior analysis, a behavior history indicating the time at which the user moved and the origin and destination of the user's movement, is generated. In the behavior analysis, user registration information in which user's stopover places and geographical coordinates thereof are associated with each other in advance, is used. The user's stopover places include, for example, the user's home, workplace, usual charging places for the user other than home and the workplace, and other stopover places. Using the user registration information, it is possible to obtain a behavior history indicating the time at which the user moved and the origin and destination of the user's movement, from the geographical coordinates and the time of a user's movement route obtained from the probe data.

For example, the user behavior history 32 shown in FIG. 3 indicates that the user moved from home (origin) to the workplace at 6:32 on June 1, moved from the workplace to a location A at 12:15 on the same date, moved from the location A to the workplace at 13:10 on the same date, and moved from the workplace to home at 18:35 on the same date. In addition, the user behavior history 32 shown in FIG. 3 indicates that the user moved from home to a location B at 8:30 on June 2, and moved from the location B to home at 16:00 on the same date. It is noted that the actual user behavior history 32 includes a history for a period long enough to predict future behaviors of the user.

In the behavior prediction in step S12, the charging assistance system 10 predicts future behaviors (traveling schedule) of the user from the past user behavior history 32. For example, in a case where the present time is June 11, behaviors for a predetermined period (in FIG. 3, two days of June 12 and June 13) in the future are predicted from a behavior pattern indicated by the user behavior history 32 prior to the present time. The behavior prediction may not necessarily be performed from the past behavior history, and may be performed on the basis of a user schedule inputted to a user's schedule management application. In addition, the behavior prediction may be performed on the basis of the past behavior history and the user schedule inputted to the schedule management application.

For example, the predicted user behavior data 33 shown in FIG. 3 indicates that the user will move from home to the workplace at 6:40 on June 12, move from the workplace to the location A at 12:00 on the same date, move from the location A to the workplace at 13:00 on the same date, and move from the workplace to home at 18:00 on the same date. In addition, the predicted user behavior data 33 shown in FIG. 3 indicates that the user will move from home to the location B at 8:30, and move from the location B to home at 16:10 on the same date. The predetermined period in the future to be predicted is not particularly limited, and may be one day or one week, for example.

Figure 4:
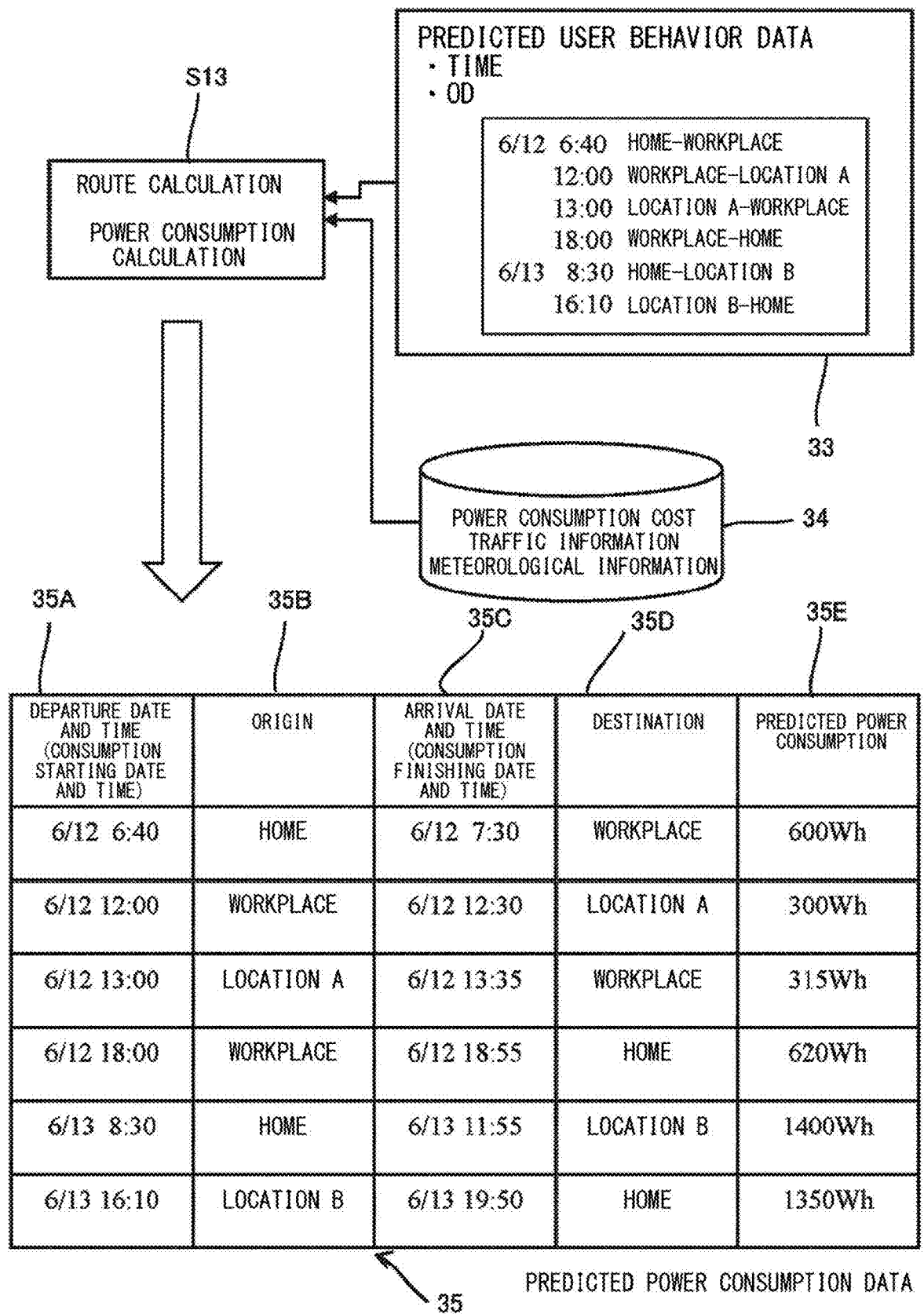
FIG. 4 illustrates a route calculation process and a power consumption calculation process.

As shown in FIG. 4, in step S13, a traveling route of the vehicle 50 for achieving the behaviors indicated by the predicted user behavior data (predicted traveling schedule) 33 for the future is calculated, and predicted power consumption needed for traveling through the traveling route is calculated.

The predicted power consumption is calculated individually for one or a plurality of behaviors indicated by the predicted user behavior data (predicted traveling schedule) 33. For example, the predicted user behavior data 33 shown in FIG. 4 (same as the predicted user behavior data 33 shown in FIG. 3) indicates six predicted behaviors, and the predicted power consumption is calculated individually for the six predicted behaviors. For example, regarding the predicted behavior of "moving from home to the workplace at 6:40 on June 12", first, a traveling route from home as an origin to the workplace as a destination is calculated. The sum of power consumption costs for one or a plurality of road links constituting the traveling route is calculated as predicted power consumption for traveling through the traveling route. The predicted power consumption calculated from the power consumption costs is corrected on the basis of traffic information such as congestion information. In addition, the predicted power consumption calculated from the power consumption costs is also corrected on the basis of meteorological information. Correcting the predicted power consumption on the basis of the traffic information or the meteorological information makes it possible to calculate more accurate predicted power consumption. Correction of the predicted power consumption may be performed on the basis of other information. Other information for correcting the predicted power consumption is, for example, a road shape (e.g., upward slope or downward slope) on the traveling route.

In calculation of the traveling route, arrival date and time at the destination are also calculated. The arrival date and time are calculated by adding a required period for the traveling route to departure date and time at the origin. The required period is calculated as the sum of required periods of traveling for the respective road links constituting the traveling route. The required period may be corrected on the basis of the traffic information or the like.

Through the power consumption calculation and the arrival date and time calculation, the predicted power consumption data 35 shown in FIG. 4 is generated from the predicted user behavior data 33. The predicted power consumption data 35 includes data items of departure date and time 35A, an origin 35B, arrival date and time 35C, a destination 35D, and predicted power consumption 35E. The departure date and time 35A, the origin 35B, and the destination 35D are taken from the predicted user behavior data 33. The arrival date and time 35C are calculated through the arrival date and time calculation on the basis of the departure date and time and the traveling route. The predicted power consumption 35E is calculated through the predicted power consumption calculation on the basis of the traveling route and the like.

In the predicted power consumption data 35 shown in FIG. 4, with respect to the predicted behavior of "moving from home to the workplace at 6:40 on June 12", the data items are prescribed as the departure date and time 35A: June 12 6:40, the origin 35B: home, the arrival date and time 35C: June 12 7:30, the destination 35D: workplace, and the predicted power consumption 35E: 600 Wh.

Similarly, with respect to the predicted behavior of "moving from the workplace to the location A at 12:00 on June 12", the data items are prescribed as the departure date and time 35A: June 12, 12:00, the origin 35B: workplace, the arrival date and time 35C: June 12, 12:30, the destination 35D: location A, and the predicted power consumption 35E: 300 Wh. Also, the other predicted behaviors are prescribed similarly.

The predicted power consumption data 35 indicates a power consumption plan in the future. Here, the power consumption plan is data indicating a time period during which power is consumed and predicted power consumption in each time period. Power consumption of the vehicle 50 occurs during traveling from the origin until arriving at the destination. Therefore, the departure date and time 35A indicate the date and time at which consumption of power is started, and the arrival date and time 35C indicate the date and time at which consumption of power is finished. That is, the time period from the departure date and time 35A to the arrival date and time 35C is the time period during which power is consumed.

Figure 5:
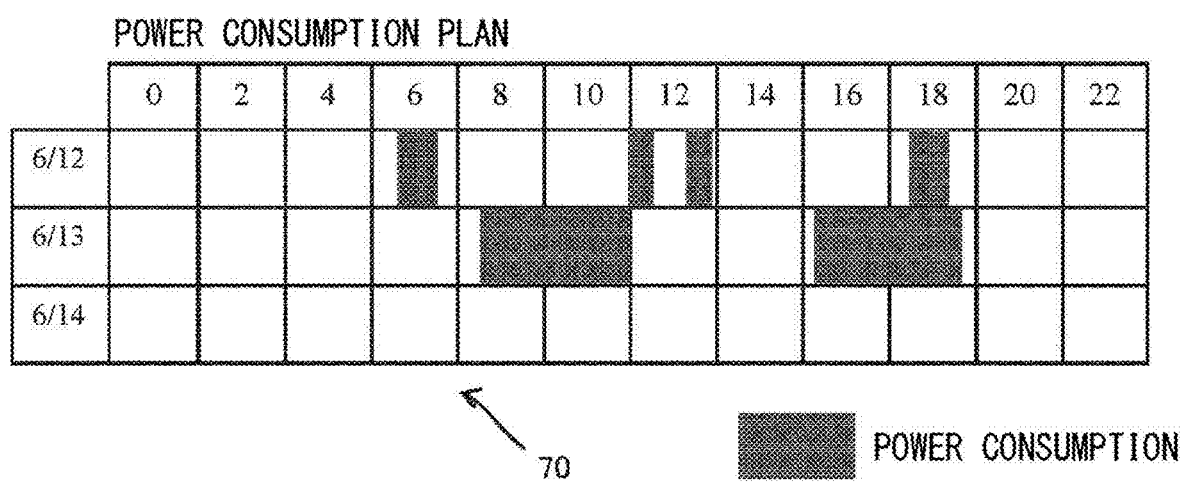
FIG. 5 is a power consumption plan chart.

FIG. 5 shows power consumption time periods (power consumption plan chart 70) in accordance with the predicted power consumption data 35 shown in FIG. 4. In FIG. 5, a plurality of gray parts represent power consumption time periods. In FIG. 5, a period from 6:40 to 7:30 on June 12 is one consumption time period (the predicted power consumption 35E is 600 Wh). In addition, a period from 12:00 to 12:30 on June 12 is one consumption time period (predicted power consumption 35E is 300 Wh), a period from 13:00 to 13:35 on June 12 is one consumption time period (predicted power consumption 35E is 315 Wh), a period from 18:00 to 18:55 on June 12 is one consumption time period (predicted power consumption 35E is 620 Wh), a period from 8:30 to 11:55 on June 13 is one consumption time period (predicted power consumption 35E is 1400 Wh), and a period from 16:10 to 19:50 on June 13 is one consumption time period (predicted power consumption 35E is 1350 Wh).

In the predicted power consumption data 35 in the embodiment, the departure date and time 35A and the arrival date and time 35C indirectly indicate a time period during which power is not consumed. The time period during which power is not consumed is a time period other than the consumption time period. Here, the time period during which power is not consumed is a time period during which the vehicle 50 is not used. The time period during which the vehicle 50 is not used is, for example, a time period during which the vehicle 50 is not traveling, i.e., a stop time period. Starting date and time of the stop period are the arrival date and time of the predicted behavior immediately before the vehicle 50 is stopped, and the finishing time of the stop period is the departure date and time of the predicted behavior after the vehicle 50 is stopped.

In the predicted power consumption data 35 in the embodiment, the origin 35B or the destination 35D indicates a stop place (predicted stop place) of the vehicle 50. For example, a case of arriving at the workplace from home, stopping at the workplace for a while, and then moving from the workplace to the location A, is assumed. In this case, the fact that the stop place is the workplace can be determined from the fact that the destination 35D of the predicted behavior of "moving from home to the workplace" before the stopping is the workplace. In addition, the fact that the stop place is the workplace can be determined from the fact that the origin 35B of the predicted behavior of "moving from the workplace to the location A" after the stopping is the workplace.

FIG. 6 shows the predicted stop data table 36 including the predicted stop place and the like. The predicted stop data table 36 includes data items of stop starting date and time 36A, stop finishing date and time 36B, and a predicted stop place 36C. The stop starting date and time 36A and the stop finishing date and time 36B are generated from the departure date and time 35A and the arrival date and time 35C in the predicted power consumption data 35 as described above. The predicted stop place 36C is generated from the origin 35B or the destination 35D in the predicted power consumption data 35 as described above. The predicted stop data table 36 shown in FIG. 6 is generated from the predicted power consumption data table 35 shown in FIG. 6, and both tables 35, 36 correspond to each other.

Stop time periods indicated by the predicted stop data 36 are represented as white parts (parts other than the gray parts (power consumption time periods)) in the power consumption plan chart 70 shown in FIG. 5. In FIG. 5, a period from 12:00 to 6:40 on June 12 is one stop time period (the stop place 36C is home), a period from 7:30 to 12:00 on June 12 is one stop time period (the stop place 36C is the workplace), a period from 12:30 to 13:00 on June 12 is one stop time period (the stop place 36C is the location A), a period from 13:35 to 18:00 on June 12 is one stop time period (the stop place 36C is the workplace), a period from 18:55 on June 12 to 8:30 on June 13 is one stop time period (the stop place 36C is home), a period from 11:55 to 16:10 on June 13 is one stop time period (the stop place 36C is the location B), and a period from 19:50 to 24:00 on June 13 is one stop time period (the stop place 36C is home).

Figure 7:
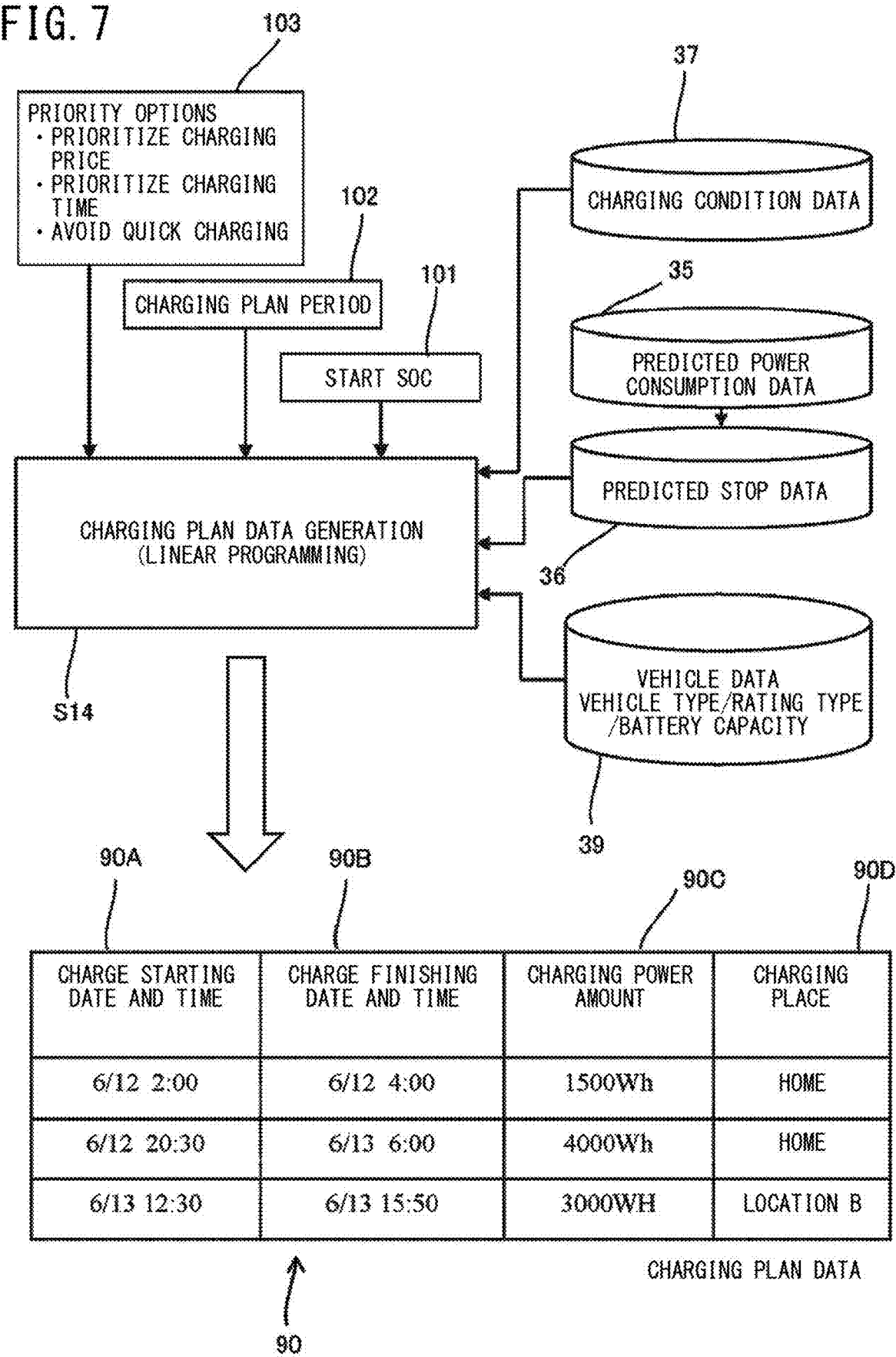
FIG. 7 illustrates a charging plan data generation process.

In the present embodiment, for facilitating the understanding, it is assumed that the charging plan for the vehicle 50 is created on the basis of the predicted power consumption 35E indicated by the predicted power consumption data table 35, and the predicted stop data table 36. That is, as shown in FIG. 7, in a charging plan data generation process in step S14, the processor 20 refers to the predicted power consumption data table 35 and the predicted stop data table 36. It is noted that, since the content of the predicted stop data table 36 is indicated by the predicted power consumption data table 35, the charging plan can actually be created on the basis of only the predicted power consumption data 35.

As shown in FIG. 7, in the charging plan data generation process in step S14, the processor 20 also refers to the charging condition data table 37. In the charging condition data table 37, charging conditions for respective charging possible places are prescribed. Therefore, the charging assistance system 10 can recognize conditions different among the predicted stop places of the vehicle 50, by referring to the charging condition data table 37.

Figure 8:
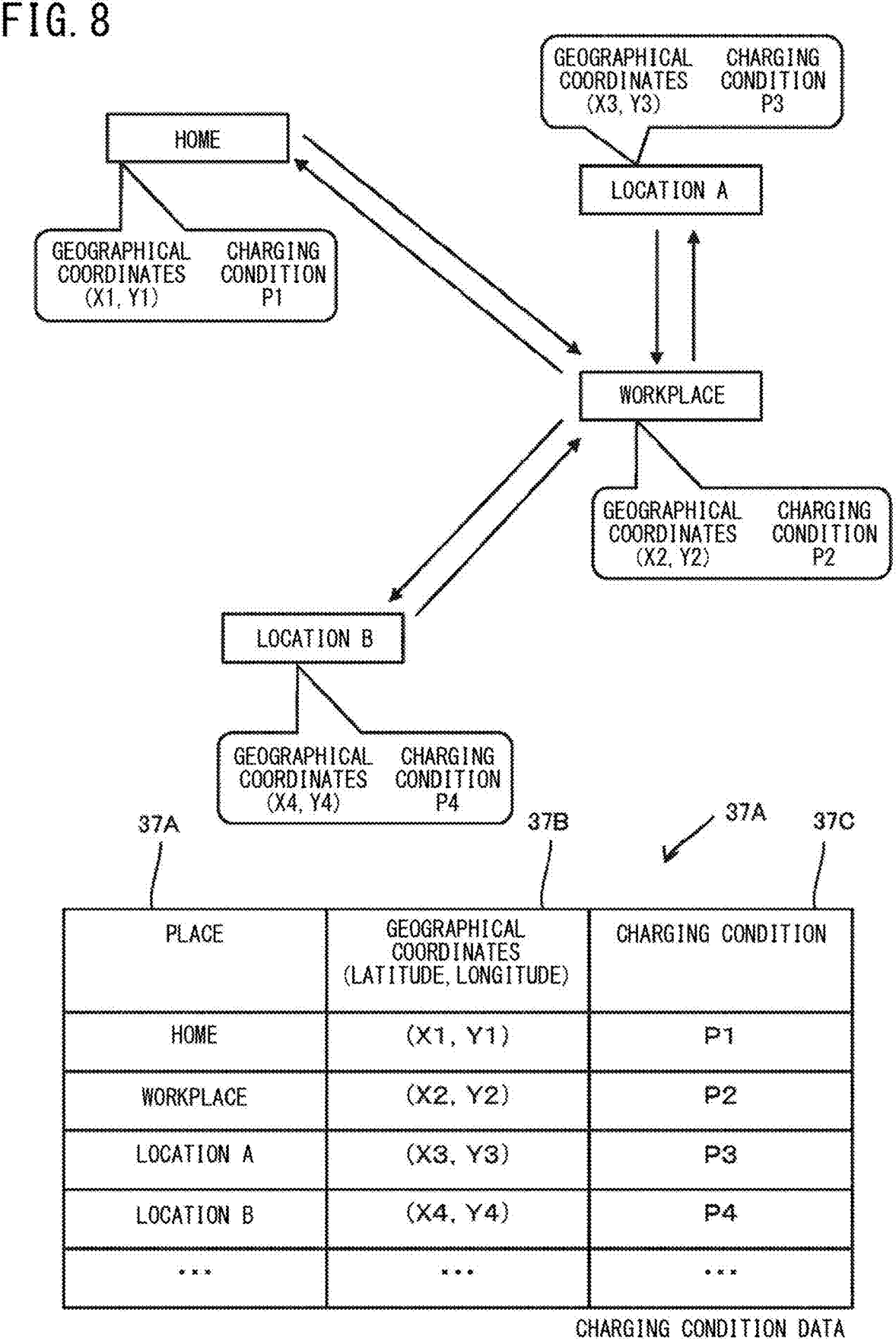
FIG. 8 illustrates charging condition data.

FIG. 8 shows an example of the charging condition data table 37. In the charging condition data table 37, charging conditions 37C on a place basis are associated with a plurality of charging possible places 37A. In the embodiment, the places 37A correspond to the user's stopover places indicated by the user registration information described above. For example, in FIG. 8, the places are home, the workplace, the location A, the location B, and the like. In FIG. 8, a charging condition P1 is prescribed for home, a charging condition P2 is prescribed for the workplace, a charging condition P3 is prescribed for the location A, and a charging condition P4 is prescribed for the location B. The charging conditions P1, P2, P3, P4 can be different among places.

The charging condition data 37 in the embodiment includes geographical coordinates 37B for each place 37A. The charging conditions 37C set in the charging condition data 37 are charging conditions at charging stations having coordinates that perfectly or approximately coincide with the geographical coordinates 37B.

Figure 9:
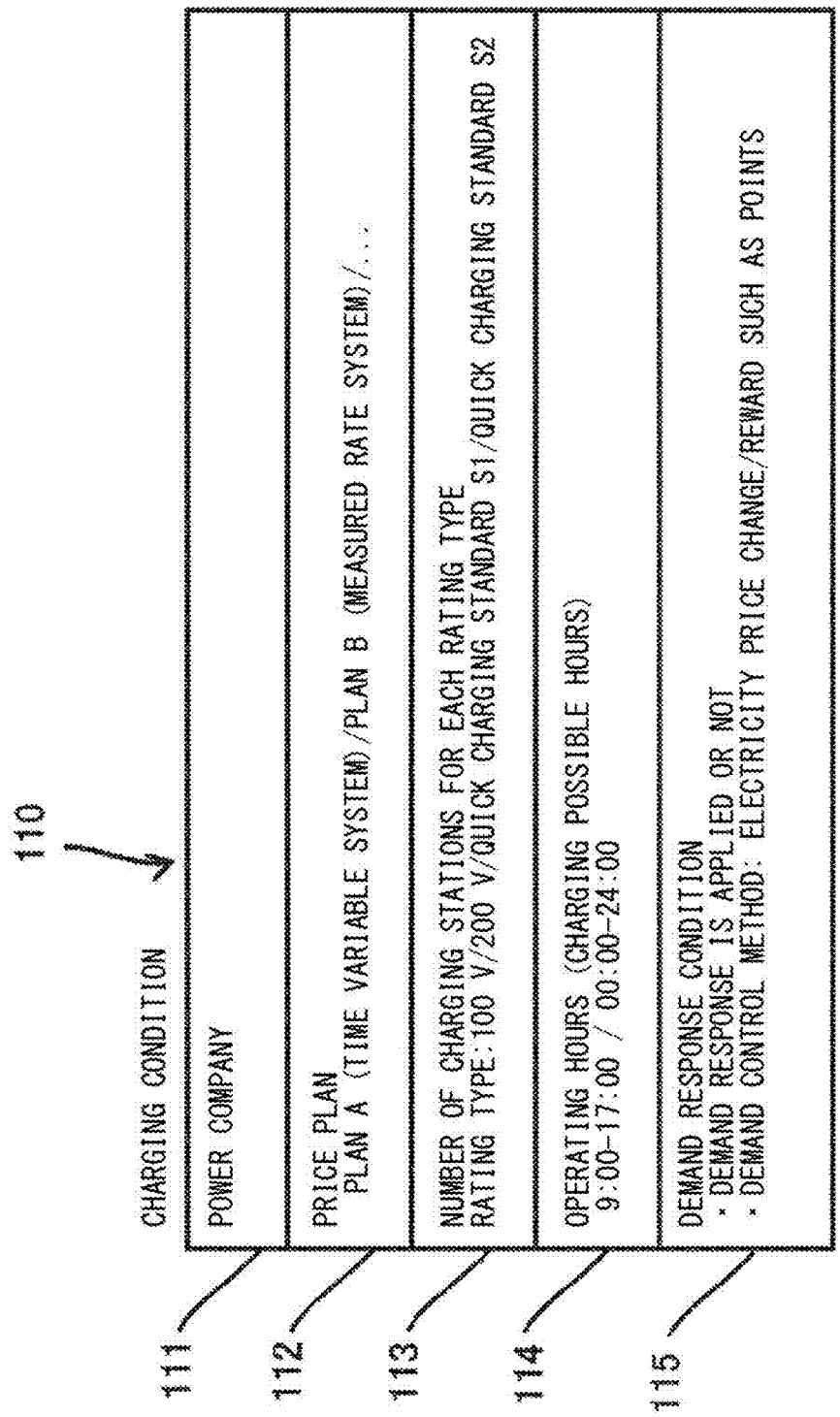
FIG. 9 illustrates charging conditions.

As shown in FIG. 9, data of a charging condition 110 includes data indicating a power company 111, a price plan 112, a number 113 of charging stations for each rating type, operating hours (charging possible hours) 114, and a demand response condition 115, for example.

Data indicating the power company 111 includes an identifier of a company that supplies power to the place 37A at which the charging condition is set. Data indicating the price plan 112 includes an identifier of an electricity price plan applied to the place 37A at which the charging condition is set. The price plan may be, for example, a time variable system or a measured rate system. The time variable system is a plan in which the price is different between daytime and nighttime, for example. The measured rate system is a plan in which the price varies depending on the consumption amount. An identifier of the electricity price plan may indicate the electricity price as free of charge. For example, in a case where charging at the workplace is free of charge, the price plan 112 is set as free of charge.

In the charging condition data 37, the number 113 of charging stations for each rating type can indicate a charging voltage at the place 37A at which the charging condition is set, or a charging standard available at the place 37A. The charging voltage is, for example, 100 V or 200 V. The charging standard is, for example, CHAdeMO (registered trademark). CHAdeMO is a type of quick charging standard. The number 113 of charging stations for each rating type is used for the charging assistance system 10 to recognize whether or not there is a rating type (charging voltage or charging standard) adaptable to the vehicle 50 to be charged at the predicted stop place. In addition, the number 113 of charging stations for each rating type is used for the charging assistance system 10 to discriminate whether the charging type at the predicted stop place is quick charging or normal charging.

In the charging condition data 37, the operating hours 114 indicate charging possible hours at the place 37A at which the charging condition is set. In a case where the place 37A is a commercial charging station, the charging possible hours are basically limited to the operating hours, but in a case of home, charging is basically possible at all times. For example, the charging possible hours are set as 9:00-17:00 or 00:00-24:00.

In the charging condition data 37, the demand response condition 115 indicates whether or not demand response is applied at the place 37A at which the charging condition is set, and a method of power demand control adopted in the demand response. The demand response is to change a power consumption pattern so as to suppress usage of power on a consumer side in accordance with the electricity price setting or incentive payment, when the wholesale price rises or grid reliability is reduced. The method of power demand control is, for example, changing the electricity price, providing a reward such as points to a consumer in accordance with suppression of power usage, or the like.

Therefore, there may be a difference in the electricity price or the like between an area where demand response is applied and an area where demand response is not applied. That is, the charging condition differs depending on whether or not demand response is applied. In addition, under application of demand response, for example, power-saving may be requested in a certain time period. In this case, the charging assistance system 10 creates the charging plan subject to a time constraint condition that charging cannot be performed in the above time period. As described above, the demand response condition 115 is used for the charging assistance system 10 to recognize whether or not demand response is applied and, if demand response is applied, recognize the charging condition in that case.

In the charging plan data generation process in step S14, the processor 20 extracts the charging condition at each predicted stop place 36C indicated by the predicted stop data 36, from the charging condition data table 37. In a case of the predicted stop data 36 shown in FIG. 6, the charging condition P1 at home, the charging condition P2 at the workplace, the charging condition P3 at the location A, and the charging condition P4 at the location B are extracted.

In addition, the processor 20 reads the vehicle data about the vehicle 50 for which the charging plan is to be created, from the vehicle data table 39. In generating the charging plan, whether or not the rating type indicated by the vehicle data and the rating type indicated by the charging condition match each other (charging is possible) is determined, and the charging plan at a place where the rating types are matched among the predicted stop places, is created.

The processor 20 creates the charging plan so that the charging amount of the vehicle 50 will not become insufficient, on the basis of the charging condition at each predicted stop place of the vehicle 50. In generating the charging plan, a state of charge 101 (start SOC) at a starting time (e.g., 0:00 on June 12) of a charging plan period 102 (e.g., June 12 and June 13) and the predicted power consumption 35E for each consumption time period, are taken into consideration. The charging plan is created so that charging will be performed at the predicted stop place during the predicted stop time period, so as to prevent the state of charge of the vehicle 50 from becoming zero even when power is consumed in accordance with the predicted power consumption 35E. In addition, the charging plan is created so that the charging amount to reach a full charge state will not be exceeded, in consideration of the battery capacity indicated by the vehicle data 39.

In generating the charging plan, the length of the predicted stop time period is also taken into consideration. This is because the charging amount is proportional to time and therefore the length of the predicted stop time period indicates the maximum value of the possible charging amount per one stop.

The charging plan is created by linear programming so as to optimize a priority condition 103 selected by a user or preset, for example. As shown in FIG. 7, charging plan data 90 includes data items of charge starting date and time 90A, charge finishing date and time 90B, a charging power amount 90C, and a charging place 90D.

In the charging plan data 90 shown in FIG. 7, a plurality of times of charging are set. In FIG. 7, charging for the first time is performed during a period from 2:00 to 4:00 on June 12, the charging place 90D is home, and the charging power amount 90C is 1500 Wh. Charging for the second time is performed during a period from 20:30 on June 12 to 6:00 on June 13, the charging place 90D is home, and the charging power amount 90C is 4000 Wh. Charging for the third time is performed during a period from 12:30 to 15:50 on June 13, the charging place is the location B (or a neighborhood charging station), and the charging power amount 90C is 3000 Wh.

Figure 10:
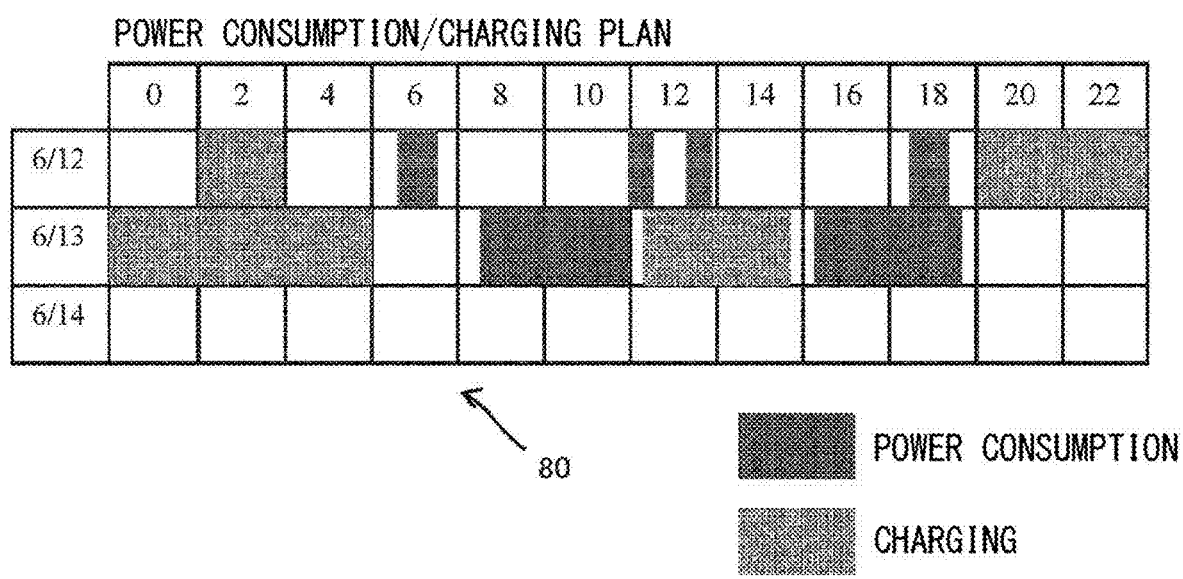
FIG. 10 is a power consumption/charging plan chart.

FIG. 10 shows power consumption time periods in accordance with the predicted power consumption data 35 shown in FIG. 4 and charging time periods in accordance with the charging plan data 90 shown in FIG. 7 (power consumption/charging plan chart 80). In FIG. 10, dark gray parts represent the consumption time periods, and light gray parts represent the charging time periods. As shown in FIG. 10, in the created charging plan, the charging time periods are set in the stop time periods other than the consumption time periods.

When the charging plan data 90 is created, the processor 20 executes a display process of transmitting the charging plan data 90 to the vehicle 50 so as to display the charging plan on a display device that the vehicle 50 or the like has (in step S15 in FIG. 2). Here, the predicted power consumption data 35 and the predicted user behavior data 33 are also transmitted together with the charging plan data 90, to the vehicle 50.

Figure 11:
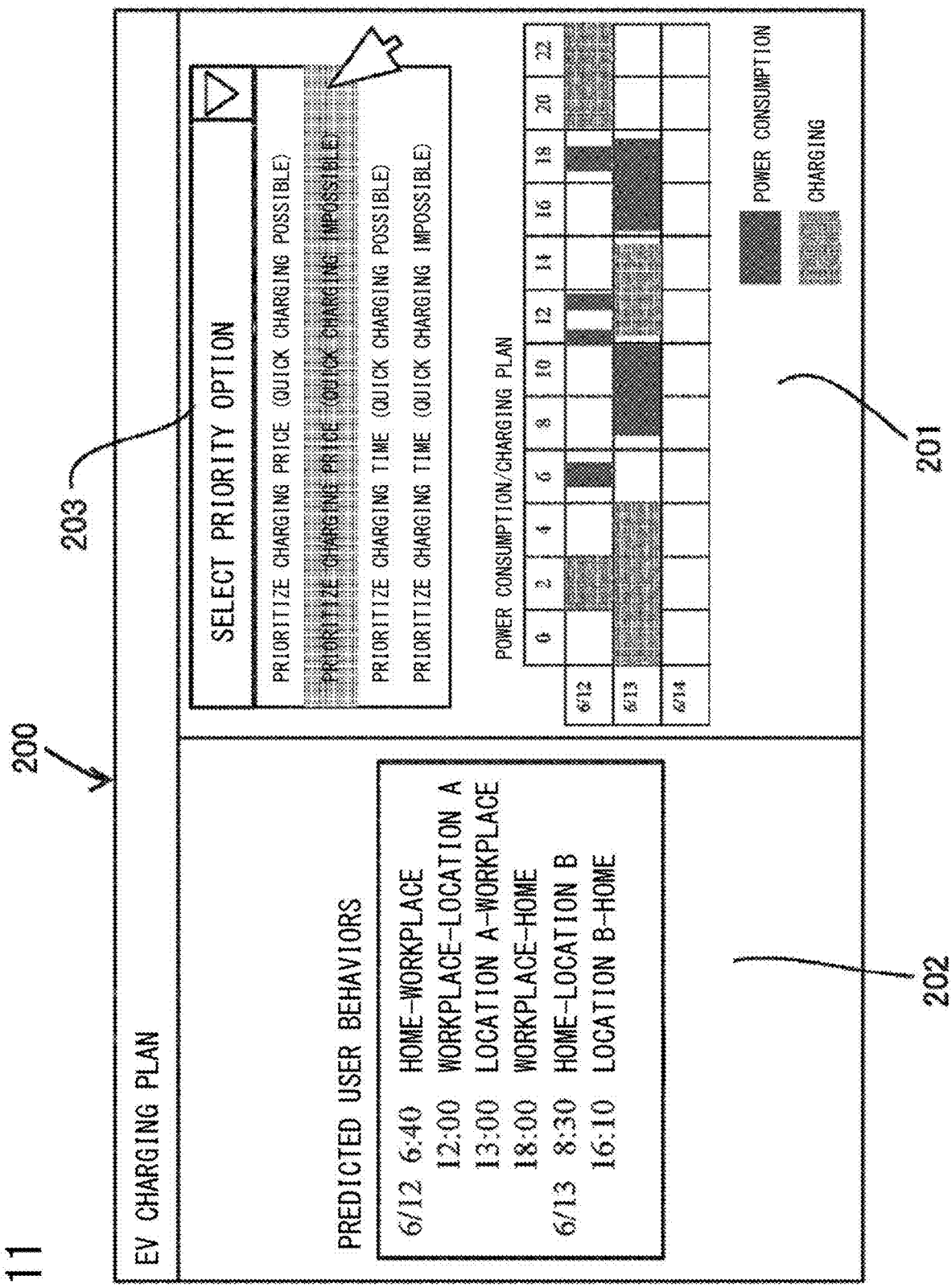
FIG. 11 shows a charging plan display screen.

FIG. 11 shows an example of a display screen 200 of the charging plan displayed on the display device of the vehicle 50. The display screen 200 has an area 201 for displaying the power consumption/charging plan chart 80. In the area 201, the power consumption/charging plan chart 80 as shown in FIG. 10 is displayed. The user can easily recognize when to perform charging, by referring to the plan chart 80.

In addition, the display screen 200 has an area 202 for displaying the predicted user behaviors (predicted traveling schedule). The user can recognize the behaviors predicted by the system 10, by referring to the predicted user behaviors.

As described above, the charging plan is created so as to optimize the priority condition 103. Examples of options of the priority condition 103 include a charging price, a charging time, and quick charging avoidance. In a case where the priority condition 103 is set to prioritize a charging price, for example, the charging plan is created so as to minimize the charging price. The charging price may be different among places, and further, may vary by application of demand response. Such difference in the charging price among places or by application of demand response can be recognized from the charging condition.

In a case where the priority condition 103 is set to prioritize a charging time, for example, the charging plan is created so as to minimize the number of times of charging, or the charging plan is created so as to minimize a total charging time in the charging plan period 102. In a case where the priority condition 103 is set to avoid quick charging, the charging plan is created so as to avoid charging at a place where a quick charging type is adopted, as much as possible. Performing charging in accordance with such a charging plan as to avoid quick charging can inhibit the battery from being deteriorated due to quick charging.

The display screen 200 shown in FIG. 11 has an area 203 for the user to select an option of the priority condition. In the area 203 shown in FIG. 11, one of "prioritize charging price (quick charging possible)", "prioritize charging price (quick charging impossible)", "prioritize charging time (quick charging possible)", and "prioritize charging time (quick charging impossible)" can be selected as an option (priority option) of the priority condition.

In a case where "prioritize charging price (quick charging possible)" is selected, the charging plan is created so as to allow quick charging and minimize the charging price. In a case where "prioritize charging price (quick charging impossible)" is selected, the charging plan is created so as to avoid quick charging as much as possible and minimize the charging price. In a case where charging price "prioritize charging time (quick charging possible)" is selected, the charging plan is created so as to allow quick charging and minimize the number of times of charging or the charging time. In a case where "prioritize charging time (quick charging impossible)" is selected, the charging plan is created so as to avoid quick charging as much as possible and minimize the number of times of charging or the charging time.

Figure 12:
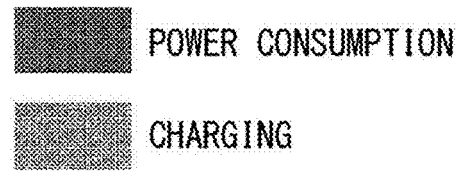
FIG. 12 is a power consumption/charging plan chart.

FIG. 12 shows an example of the power consumption/charging plan chart 80 in a case of selecting prioritizing a charging price (quick charging possible). Here, it is assumed that the prices at the workplace and the location B are low. In the charging plan created in this case, charging time periods are set within the time periods of stopping at the workplace or the location B, as much as possible.

Figure 13:
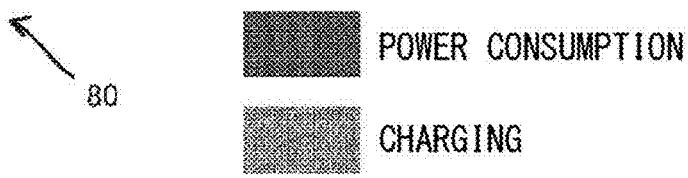
FIG. 13 is a power consumption/charging plan chart.

FIG. 13 shows an example of the power consumption/charging plan chart 80 in a case of selecting prioritizing a charging price (quick charging impossible). Here, it is assumed that a quick charging type is adopted at the location B. In the charging plan created in this case, the location B is avoided as a charging place and the power price is minimized.

Figure 14:
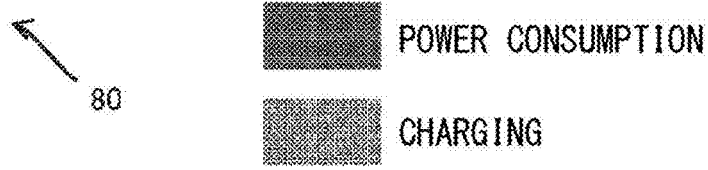
FIG. 14 is a power consumption/charging plan chart.

FIG. 14 shows an example of the power consumption/charging plan chart 80 in a case of selecting prioritizing a charging time (quick charging possible). Here, the charging plan is created so as to minimize the number of times of charging. In order to minimize the number of times of charging, time periods in which certain lengths of time can be ensured should be prioritized. Thus, in the charging plan created in this case, charging time periods are set in periods of stopping at home, as much as possible.

[Additional Note]

It should be noted that the embodiment disclosed herein is merely illustrative and not restrictive in all aspects. The scope of the present invention is defined by the scope of the claims rather than the above description, and is intended to include meaning equivalent to the scope of the claims and all modifications within the scope.

REFERENCE SIGNS LIST

10 charging assistance system
20 processor
21 charging assistance process
30 storage device
31 user probe data table
32 user behavior history table (traveling history table)
33 predicted user behavior data table (predicted traveling schedule data table)
34 data table of power consumption cost, traffic information, and meteorological information
35 predicted power consumption data table
35A departure date and time
35B origin
35C arrival date and time
35D destination
35E predicted power consumption
36 predicted stop data table
36A stop starting date and time
36B stop finishing date and time
36C predicted stop place
37 charging condition data table
37A place
37B geographical coordinates
37C charging condition
39 vehicle data table
50 vehicle
60 computer program
70 power consumption plan chart
80 consumption/charging plan chart
90 charging plan data
90A charge starting date and time
90B charge finishing date and time
90C charging power amount
90D charging place
101 state of charge
102 charging plan period
103 priority condition
110 charging condition
111 power company
112 price plan
113 number of charging stations
114 operating hours
115 demand response condition
200 display screen
201 area
202 area
203 area

The invention claimed is:

1. A charging assistance system comprising a processor configured to:
   determine a future traveling schedule of a vehicle based on a past traveling history, the traveling schedule including an origin and a destination, and
   generate charging plan data for a vehicle on the basis of:
      predicted power consumption of the vehicle calculated on the basis of the traveling schedule of the vehicle,
   a charging condition at each predicted stop place based on the traveling schedule, and a priority condition,
      wherein the charging plan data is generated to optimize the priority condition,
      an optimization of the priority condition includes a prioritization of charging time minimizing a number of times of charging to the vehicle or minimizing a total charging time and a prioritization of charging price minimizing a charging price of the vehicle,
      the processor is configured to output a display enabled to accept a selection, by a user, of priority conditions, and
      the generating the charging plan data includes generating the charging plan data based on the selection received through the display.

2. The charging assistance system according to claim 1, wherein
   the predicted stop place is determined by the processor on the basis of at least one of the origin and the destination.

3. The charging assistance system according to claim 1, wherein
   the charging plan data is generated further on the basis of a predicted stop period at each predicted stop place.

4. The charging assistance system according to claim 3, wherein
   the traveling schedule includes a departure time and an arrival time of the vehicle, and
   the predicted stop period is determined by the processor on the basis of the departure time and the arrival time.

5. The charging assistance system according to claim 1, wherein
   the charging condition includes an electricity price at the predicted stop place.

6. The charging assistance system according to claim 1, wherein the charging condition includes a charging voltage at the predicted stop place.

7. The charging assistance system according to claim 1, wherein
the charging condition includes a charging standard available at the predicted stop place.

8. The charging assistance system according to claim 1, wherein
the charging condition includes a condition set for the predicted stop place in accordance with demand response.

9. The charging assistance system according to claim 1, wherein
the processor further executes control to display the traveling schedule and a charging plan indicated by the charging plan data, on a display device.

10. A charging assistance system comprising:
a storage device configured to store, for a plurality of charging possible places, charging condition data in which the places and charging conditions at the places are associated with each other; and
a processor configured to acquire the charging condition at a predicted stop place of a vehicle by referring to the charging condition data, and generate charging plan data for the vehicle on the basis of the acquired charging condition and a priority condition, wherein
the charging plan data is generated to optimize the priority condition,
an optimization of the priority condition includes a prioritization of charging time minimizing a number of times of charging to the vehicle or minimizing a total charging time and a prioritization of charging price minimizing a charging price of the vehicle,
the processor is configured to output a display enabled to accept a selection, by a user, of priority conditions, and
the generating the charging plan data includes generating the charging plan data based on the selection received through the display.

11. The charging assistance system according to claim 10, wherein
the predicted stop place is determined by the processor on the basis of a future traveling schedule of the vehicle.

12. A method comprising:
determining a future traveling schedule of a vehicle based on a past traveling history, the traveling schedule including an origin and a destination; and
generating charging plan data for a vehicle on the basis of: predicted power consumption of the vehicle calculated on the basis of the traveling schedule of the vehicle, a charging condition at each predicted stop place based on the traveling schedule, and a priority condition, and
outputting a display enabled to accept a selection, by a user, of priority conditions,
wherein the charging plan data is generated to optimize the priority condition,
an optimization of the priority condition includes a prioritization of charging time minimizing a number of times of charging to the vehicle or minimizing a total charging time and a prioritization of charging price minimizing a charging price of the vehicle, and
the generating the charging plan data includes generating the charging plan data based on the selection received through the display.

13. A method comprising acquiring, by referring to charging condition data in which a plurality of charging possible places and charging conditions at the places are associated with each other, the charging condition at a predicted stop place of a vehicle, generating charging plan data for the vehicle on the basis of the acquired charging condition and a priority condition, and outputting a display enabled to accept a selection, by a user, of priority conditions, wherein
the charging plan data is generated to optimize the priority condition,
an optimization of the priority condition includes a prioritization of charging time minimizing a number of times of charging to the vehicle or minimizing a total charging time and a prioritization of charging price minimizing a charging price of the vehicle, and
the generating the charging plan data includes generating the charging plan data based on the selection received through the display.

14. A non-transitory computer readable storage medium storing a computer program for causing a computer to execute steps comprising:
a process of determining a future traveling schedule of a vehicle based on a past traveling history, the traveling schedule including an origin and a destination,
a process of generating charging plan data for a vehicle on the basis of: predicted power consumption of the vehicle calculated on the basis of the traveling schedule of the vehicle; a charging condition at each predicted stop place based on the traveling schedule, and a priority condition,
outputting a display enabled to accept a selection, by a user, of priority conditions,
the charging plan data is generated to optimize the priority condition,
an optimization of the priority condition includes a prioritization of charging time minimizing a number of times of charging to the vehicle or minimizing a total charging time and a prioritization of charging price minimizing a charging price of the vehicle, and
the generating the charging plan data includes generating the charging plan data based on the selection received through the display.

15. A non-transitory computer readable storage medium storing a computer program for causing a computer to execute a process comprising acquiring, by referring to charging condition data in which a plurality of charging possible places and charging conditions at the places are associated with each other, the charging condition at a predicted stop place of a vehicle, generating charging plan data for the vehicle on the basis of the acquired charging condition and a priority condition, and outputting a display enabled to accept a selection, by a user, of priority conditions,
wherein the charging plan data is generated to optimize the priority condition,
an optimization of the priority condition includes a prioritization of charging time minimizing a number of times of charging to the vehicle or minimizing a total charging time and a prioritization of charging price minimizing a charging price of the vehicle, and
the generating the charging plan data includes generating the charging plan data based on the selection received through the display.

* * * * *